June 25, 1929.  W. MAIER  1,718,570
CUTTING MACHINE
Filed Nov. 12, 1927   2 Sheets-Sheet 1

Inventor:
William Maier,
By Hugh K. Wagner
Attorney.

June 25, 1929.  W. MAIER  1,718,570

CUTTING MACHINE

Filed Nov. 12, 1927  2 Sheets-Sheet 2

Inventor
William Maier,
By Hugh K. Wagner,
Attorney.

Patented June 25, 1929.

1,718,570

UNITED STATES PATENT OFFICE.

WILLIAM MAIER, OF ST. LOUIS, MISSOURI.

CUTTING MACHINE.

Application filed November 12, 1927. Serial No. 232,746.

This invention relates broadly to a machine for operating at regular intervals upon consecutive portions of a length of stock as the stock is being regularly fed thereto; and the principal object of the invention is the provision of a simple and efficient means for adjusting the machine to operate at any one of a range of intervals that the capacity of the machine and operating conditions will allow.
Other objects and desirable features of the invention, more or less ancillary to the foregoing, will be apparent as the description proceeds.

Briefly described, the machine comprises a tool that travels in successive cycles and operates upon the stock at a predetermined phase in each cycle, and means for moving the tool in the direction of and in suitable speed relation to the speed of the stock during the operating phase, and at selected speeds during other phases, thereby to determine the intervals of operation of the tool on the stock. For the purpose of illustration, and not in a limiting sense, the invention has been embodied in a cutting machine of the type disclosed in applicant's United States Patent Number 1,318,892 issued October 14, 1919, and comprising a pair of rolls having helically disposed cutting tools or knives on the peripheral face thereof and that act conjointly on opposite sides of a web of stock that is fed therebetween to sever the same transversely into consecutive sections. Obviously, the cutting edges of the knives or the portion thereof that enters the stock must travel as nearly as possible at the same linear speed as the web during the cutting operation, and, were the rolls to rotate continuously and at a fixed speed throughout each rotation or cycle of travel of the knives, only sections of one length could be produced as determined by the length of the closed orbit described by the edges of the knives. In the machine of the aforesaid Patent Number 1,318,892, the intervals of cutting of the knives, and consequently the length of the severed sections, may be varied by operating the rolls intermittently, and the length of the severed sections depends upon the length of time that elapses between successive rotations of the knives. The present invention contemplates that the rotation of the cutting rolls shall be continuous, the speed thereof being fixed during the cutting operation and selected from a range of speeds during other phases of the cycle of rotation, thereby to enable the machine to be set to produce sections of a desired length.

In the accompanying drawings forming part of this specification, in which like numbers of reference denote like parts wherever they occur, Figure 1 is a side elevation of a cutting machine of the character described and embodying the present invention.

Figure 4 is a diagram illustrating another form of the variable speed transmission that affords a range of alternative speeds.

Figure 1:
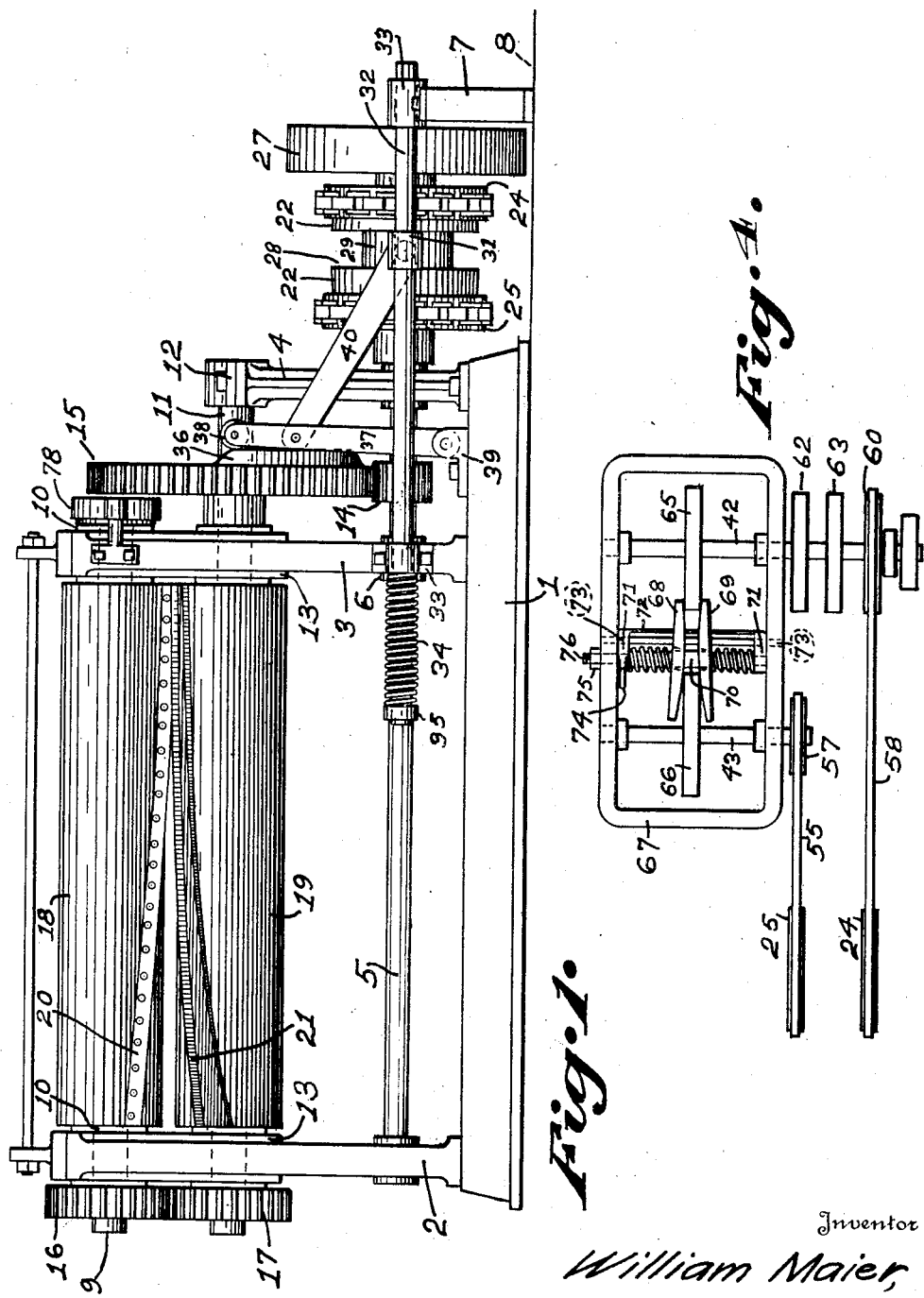

The frame of the cutting machine comprises a bed 1, having fixed thereon the left and right main standards 2 and 3, respectively, and the auxiliary standard 4, as best shown in Figure 1. A drive shaft 5 is journaled in suitable bearings 6 in the lower portions of the standards 2, 3, and 4, and in another standard 7 secured to the floor 8. A shaft 9 is journaled in vertically adjustable bearings 10 in the upper portions of the standards 2 and 3; and a shaft 11 is journaled in a bearing 12 in the standard 4 and in bearings 13 disposed in the standards 2 and 3 under the bearings 10. A pinion 14, affixed to the drive shaft 5 between the standards 3 and 4, meshes with a gear 15, affixed to the shaft 11. Shafts 9 and 11 project outwardly from their respective bearings in the standard 2, and have affixed to their said projecting portions the intermeshing gears 16 and 17, respectively. Rolls 18 and 19 are affixed on the shafts 9 and 11, respectively, and carry helically disposed knives 20 and 21, respectively, thereon. The rolls 18 and 19 rotate in opposite directions so that both knives travel with the material that is being passed between the rolls and co-operate on opposite sides of the web or strip of stock or material to sever the same transversely.

A driven clutch-member 22 is mounted on the shaft 5 between the standards 4 and 7, and is connected thereto by a feather key 23 so that it rotates with the shaft but is slidable longitudinally thereon. A fixed-speed driving clutch-member 24 is loosely mounted on the shaft 5 to the right of the driven member 22; and a variable-speed driving clutch member 25 is loosely mounted on the shaft 5 to the left of the driven member 22. The driving members 24 and 25 are restrained from moving longitudinally on the shaft 5 by means of set collars 26, affixed on the shaft 5 adjacent thereto. The clutch members may be of any suitable type, but the conical form is deemed preferable, the driven member being of male, and the driving members of female, formation. A fly wheel 27, affixed to the shaft 5 adjacent the fixed-speed member 24, insures continuance of rotation of shaft 5 while the driven member 22 is being shifted on the shaft 5 from one driving member to the other. Clutch-member 22 is provided with an intermediate annular concentric groove 28 in its peripheral face to receive a yoke 29 of a shifting arm 30, whose opposite end 31 is of sleeve formation to fit a horizontal shaft 32 to which it is affixed. Shaft 32 is slidable longitudinally in bearings 33, secured to the standards 3 and 7, respectively. The inner end of shaft 32 projects a suitable distance from the standard 3 to accommodate an expansile spring 34, coiled around the shaft to bear against the bearing 33 and a collar 35, affixed on the inner end of the shaft. A cam flange 36 rises from the lateral face of gear 15, and operates a follower 37 through the intervention of an antifriction roller 38, mounted on the upper end of the follower arm 37. The lower end of arm 37 is pivoted to a block 39, secured to the bed 1, so as to be capable of rocking to and from the lateral face of the gear 15. A link 40 is pivotally connected at one end to the arm 37 and at the other end to the clutch-shifting arm 30. For each revolution of the gear 15, and consequently of the rolls 18 and 19, the clutch is shifted twice by the cam flange 36 through the intervention of the mechanism just described so as to alternately connect the shaft 5 to the fixed-speed driving member and the variable-speed driving member, the spring 34 maintaining roller 38 in engagement with the cam flange 36. The flange 36 is of such length and so positioned angularly with relation to the knives 20 and 21 that the shaft 5 is driven by the fixed-speed driving member 24 during that phase, at least, of the cycle of rotation of the rolls 18 and 19 in which the knives operate upon opposite sides of the material to sever it transversely into consecutive sections. During the remaining portion of the cycle of operation, the clutch is shifted to connect the shaft 5 to the variable-speed driving member 25, remains in that position for a certain period, and is then shifted back again to connect the shaft 5 to the fixed-speed driving member 24.

Figure 2:
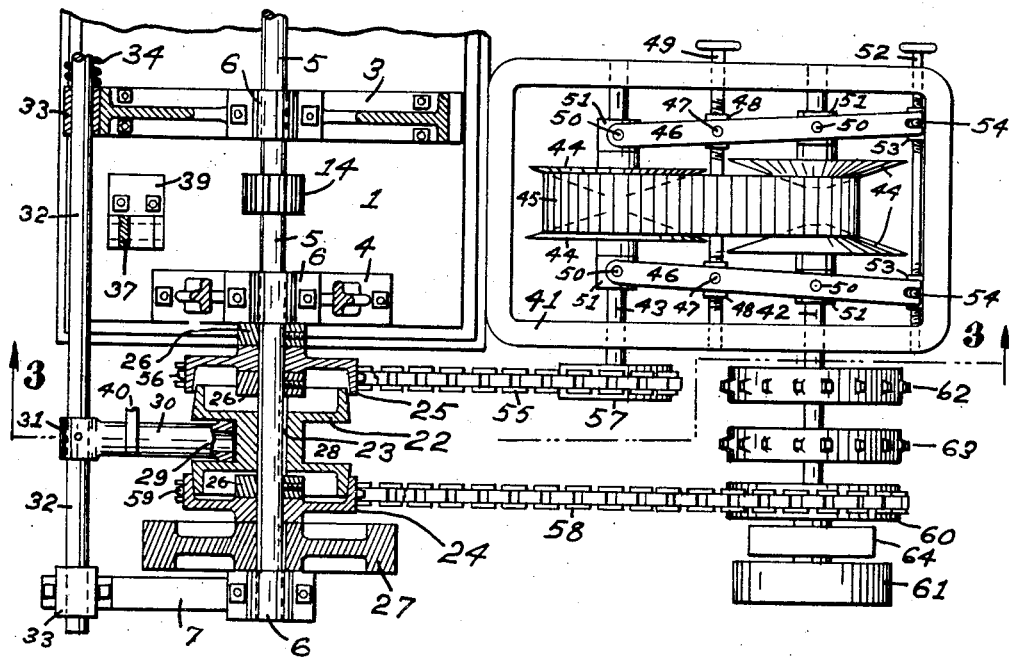
Figure 2 is a fragmentary plan view of the machine showing the fixed speed and variable speed driving member and other parts in section.
Figure 3:
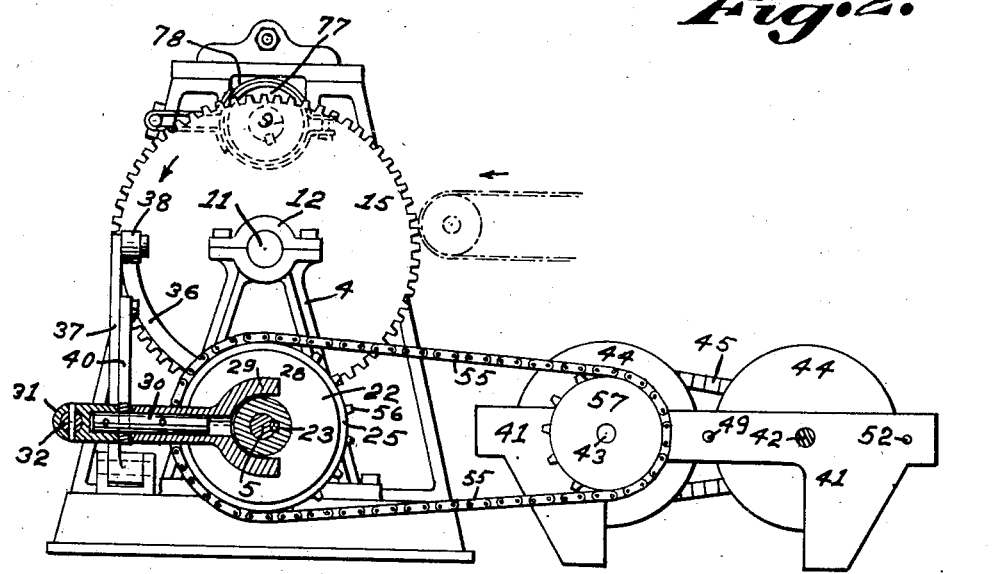
Figure 3 is a vertical sectional view taken on the line 3—3 of Figure 2.

One form of variable speed transmission is shown in Figures 2 and 3. It comprises a frame 41, having journaled therein a drive shaft 42 and a driven shaft 43 parallel thereto. The shafts 42 and 43 each carry a pair of cone-faced discs 44, mounted with their apexes facing, over which runs a belt 45 having beveled lateral faces to fit the V-shaped throat formed by the discs 44. The discs 44 are feather-keyed to their respective shafts, so as to rotate therewith and yet be capable of being shifted longitudinally thereon. The discs are shifted by levers 46, pivoted at 47 to blocks or nuts 48, on a belt-tightening screw 49, journaled in the frame 41, and are, also, pivotally connected at 50 to collars 51, that are loosely mounted on the respective shafts and bear against the discs 44. The levers 46 are operated simultaneously in opposite directions by rotating the screw 52, journaled in the frame 1 and having right- and left-hand threads engaged by respective nuts 53 that are pivoted at 54 to the levers 46. The variable-speed shaft 43 drives the variable-speed clutch-member 25 preferably through a sprocket chain 55, passing over sprocket teeth 56 on member 25 and over a sprocket wheel 57, affixed to shaft 43. The fixed-speed clutch member 24 may be driven at a constant speed through a sprocket chain 58, passing over sprocket teeth 59 on member 24 and over a sprocket wheel 60, affixed to constant-speed shaft 42. Shaft 42 has affixed thereto a pulley 61, to which power may be transmitted from any suitable motor. Sprocket wheels 62 and 63, affixed to shaft 42, may be connected to drive the mechanisms that convey the material or stock to and from the cutting machine, respectively, the stock being fed to the cutting machine at a linear speed that is suited to the peripheral speed of the cutting edges of the knives 20 and 21 during the cutting phase of the cycle of operations of the cutting machine. If desired, the mechanism for conveying the stock from the cutting rolls may be omitted, and only the mechanism for feeding the stock thereto may be used, as indicated in dotted lines in Figure 4. This transmission provides an extremely flexible speed control, and the peripheral speed of the knives 20 and 21 during the non-cutting phase of the cycle of rotation may be varied by infinite degrees by rotating the screw 52 in the proper direction until a speed is obtained between fastest and slowest at which severed sections of the desired length are produced. The extended outer end of shaft 42 is preferably journaled in a standard 64.

Another manner of obtaining the desired speed for the member 25 from a range of available alternative speeds is illustrated in Figure 4. Shafts 42 and 43 have affixed thereon the discs 65 and 66, respectively, and are journaled in a suitable frame 67. The discs 68 and 69, having their inner surfaces slightly convex, fit loosely on a shaft 70 and are spring-pressed to engage the lateral faces of the discs 65 and 66 near their rims. The stationary shaft 70 is affixed in the substantially vertical arms 71 of a U-shaped frame 72, pivoted at their lower ends 73 to the frame 67. A handle 74 is formed as an integral extension of the upper end of an arm 71 and may be shifted to move the discs 68 and 69 from one to the other of the discs 65 and 66 to vary the speed of the shaft 43. The shaft 70 may pass through an arcuate slot in one side of the frame 67 and may be clamped against the frame in any position by means of the nut 75 on the threaded end 76 of the shaft 70.

A pulley 77 is preferably affixed to shaft 9 adjacent the standard 3; and a brake band 78, supported from the standard 3, exerts frictional pressure on the pulley 77, in order to compensate for backlash in the gears 16 and 17 and to thereby insure at all times the proper positioning of the knives 20 and 21 with relation to one another.

Having thus fully described this invention, I hereby reserve the benefit of all changes in form, arrangement, order, or use of parts, as it is evident that many minor changes may be made therein without departing from the spirit of this invention or the scope of the following claims.

I claim:

1. In a machine for operating at intervals upon successive portions of stock that is moving continuously therethrough, the combination, with a tool adapted for traveling in successive cycles and to operate upon the moving stock at a phase in each cycle, of a fixed speed drive means for moving the tool synchronously with the stock effective during the aforesaid phase of each cycle, and alternatively effective adjustable speed drive means for moving the said tool at a selected speed effective during another phase of each cycle, whereby the adjustment of the adjustable speed drive means determines the intervals of operation of said tool.

2. In a machine for operating at intervals upon consecutive portions of moving stock, the combination, with a tool adapted for traveling in successive cycles and to operate upon the moving stock at a phase in each cycle, of fixed speed drive means for moving the tool at a speed substantially equal to that of the moving stock, adjustable speed drive means for moving the tool at a selected speed, and automatic means for rendering the fixed speed drive means effective and the adjustable speed drive means ineffective when the tool is in the said phase, and the adjustable speed drive means effective and the fixed speed drive means ineffective when the tool is in another phase of the cycle.

3. In a machine for operating upon moving stock, tool means arranged to operate at intervals upon the moving stock, a fixed speed drive means and an adjustable speed drive means for said tool means, clutch means for effecting alternative connection of said tool means with each of said drive means, and automatic means for operating said clutch means to cause the fixed speed drive means to drive the tool during that portion of its cycle of operation at which it operates upon the moving stock, and to cause the adjustable speed drive means to drive the tool at another portion of its cycle.

4. In a machine for operating upon moving stock, tool means arranged to operate at intervals upon the moving stock, a fixed speed drive means and an adjustable speed drive means therefor, clutch means for alternative connection with each of said drive means, a driving connection between said clutch means and said tool, and means operated by said connection for connecting said clutch means to the fixed speed drive means while the tool operates upon the stock, and to the adjustable speed drive means between the intervals of operation of the tool upon the stock 5. In a machine for operating upon moving stock, tool means arranged to operate at intervals upon the moving stock, a fixed speed drive means and an adjustable speed drive means therefor, clutch means for effecting alternative connection of said tool means with each of said drive means, automatic means for operating said clutch means to cause the fixed speed drive means to drive the tool during that portion of its cycle of operation at which it operates upon the moving stock, and to cause the adjustable speed drive means to drive the tool at another portion of its cycle, and inertia means for continuing the driving movement of said clutch means while its connection is being changed from one to the other of said drive means.

In testimony whereof I hereunto affix my signature.

WILLIAM MAIER.